United States Patent
Chen et al.

(10) Patent No.: US 11,401,920 B2
(45) Date of Patent: Aug. 2, 2022

(54) LIGHTNING STRIKE FAULT MONITORING SYSTEM FOR WIND TURBINE GENERATOR SYSTEM AND LIGHTNING PROTECTION SYSTEM

(71) Applicant: GUANGZHOU SPECIAL PRESSURE EQUIPMENT INSPECTION AND RESEARCH INSTITUTE, Guangzhou (CN)

(72) Inventors: Zhigang Chen, Guangzhou (CN); Shiping Li, Guangzhou (CN); Bo Yang, Guangzhou (CN); Maodong Li, Guangzhou (CN); Jinmei Lin, Guangzhou (CN); Zhigang Wang, Guangzhou (CN); Wei Zhai, Guangzhou (CN); Guojia Huang, Guangzhou (CN); Shuanghong Zhang, Guangzhou (CN); Mingliang Xin, Guangzhou (CN); Zhenling Wu, Guangzhou (CN)

(73) Assignee: GUANGZHOU SPECIAL PRESSURE EQUIPMENT INSPECTION AND RESEARCH INSTITUTE, Guangzhou (CN)

( * ) Notice: Subject to any disclaimer, the term of this patent is extended or adjusted under 35 U.S.C. 154(b) by 754 days.

(21) Appl. No.: 16/345,507

(22) PCT Filed: Sep. 5, 2017

(86) PCT No.: PCT/CN2017/100583
§ 371 (c)(1),
(2) Date: Apr. 26, 2019

(87) PCT Pub. No.: WO2019/019267
PCT Pub. Date: Jan. 31, 2019

(65) Prior Publication Data
US 2019/0277260 A1 Sep. 12, 2019

(30) Foreign Application Priority Data
Jul. 24, 2017 (CN) .......................... 201710606011.8

(51) Int. Cl.
*F03D 80/30* (2016.01)
*F03D 17/00* (2016.01)

(52) U.S. Cl.
CPC ............. *F03D 80/30* (2016.05); *F03D 17/00* (2016.05); *F05B 2260/80* (2013.01); *Y02E 10/72* (2013.01)

(58) Field of Classification Search
CPC ...... F03D 80/30; F03D 17/00; F05B 2260/80; H02G 13/60; H02G 13/80; B64D 45/02;
(Continued)

(56) References Cited

U.S. PATENT DOCUMENTS 5,684,667 A * 11/1997 Hsieh ..................... H04Q 1/116
361/124

FOREIGN PATENT DOCUMENTS

CN 2033544 U 3/1989
CN 101237124 A 8/2008
(Continued)

OTHER PUBLICATIONS

English translation of Written Opinion of the International Searching Authority for International Application No. PCT/CN2017/100583, dated Apr. 20, 2018 (3 pages). (Year: 2018).*
(Continued)

*Primary Examiner* — Topaz L. Elliott
(74) *Attorney, Agent, or Firm* — Kagan Binder, PLLC

(57) ABSTRACT

A lightning strike fault monitoring system for a wind turbine generator system and a lightning protection system (110) thereof, wherein the lightning strike fault monitoring system
(Continued)

for the wind turbine generator system includes the lightning protection system. The lightning protection system (110) comprises a main body (101) provided with a blind hole (1011), a core (102), a connecting member (103) made of gasifiable material, a first elastic member (104), a second elastic member (105), a sealing cover (106), a bottom plate (107), and a switch used for connecting between an external signal source and a detecting terminal. The core (102) and the first elastic member (104) are respectively accommodated in the blind hole (1011), and the core (102) is connected to the main body through the connecting member (103). One end of the first elastic member (104) abuts against the core (102), and the other end is connected to the bottom wall of the blind hole (1011). One side of the sealing cover (106) is connected to the bottom plate (107) through the second elastic member (105), and the other side of the sealing cover (106) abuts against the core (102). The switch is mounted on the bottom plate (107). The lightning protection system (110) can accurately provide electrical signals for the detecting terminal, so that maintainer can be accurately aware of the occurrence of a lightning strike in order to perform maintenance and troubleshooting of lightning strike failure, thereby improving safety.

10 Claims, 3 Drawing Sheets

(58) Field of Classification Search
CPC ........ H01D 1/14; H01T 4/08; G01R 29/0814; G01R 29/0842
See application file for complete search history.

(56) References Cited

FOREIGN PATENT DOCUMENTS

| | | |
|---|---|---|
| CN | 103696911 A | 4/2014 |
| CN | 105162089 A | 12/2015 |
| CN | 106246476 A | 12/2016 |
| WO | 2011072822 A2 | 6/2011 |

OTHER PUBLICATIONS

International Search Report, and English Translation thereof, for International Application No. PCT/CN2017/100583, dated Apr. 20, 2018 (6 pages).
Written Opinion of the International Searching Authority for International Application No. PCT/CN2017/100583, dated Apr. 13, 2018 (3 pages).

* cited by examiner

LIGHTNING STRIKE FAULT MONITORING SYSTEM FOR WIND TURBINE GENERATOR SYSTEM AND LIGHTNING PROTECTION SYSTEM

TECHNICAL FIELD

The present disclosure relates to a technical field of power electronics, and more particularly, to a lightning strike fault monitoring system for a wind turbine generator system and a lightning protection system.

BACKGROUND

Offshore wind power generation has the advantages of abundant wind energy resources, high and stable wind speed, no land occupation, suitable for large-scale development, etc., and has great development potential. Therefore, the application of offshore wind power becomes a development trend of the wind power generation. Since an offshore wind turbine generator (a wind turbine generator system) is generally located at a high position and the wind turbine has a long sleeve and a long blade, a tip of the wind turbine generator is located at a great distance from the ground. Then under thunderstorm weather, it is easy to be struck by lightning. During daily inspection and maintenance, it is often found that the wind turbine blade has cracks or bulges, or is broken caused by a lightning strike. In many cases, the cracks or bulges are inconspicuous, and they are difficult to be found during the inspection. However, if small cracks or bulges are not treated in time, a further damage such as water accumulation or sun-crack may be caused, to affect the balance of wind turbine blades and power generation efficiency, and affect the safe operation of the wind turbine generator system.

At present, by installing a lightning rod on the wind turbine generator, a metal lightning receiving point capable of attracting the lightning is arranged around a portion of the blade close to the tip end. After being struck by lightning, the lightning receiving point may transmit lightning current to a ground line located inside the tower through a conductive rod or a conductive wire connected to the lightning receiving point. The lightning current may be transmitted to the ground through the lightning receiver point. In this way, it can effectively protect other parts of the wind turbine blade from lightning damage. However, this is only a simple way to protect other parts of the wind turbine blade from lightning damage. The maintainer may be not able to know the wind turbine generator system has been subjected to a lightning strike in time, and a fault in the wind turbine generator system caused by the lightning strike may be ignored, which may seriously affect the safety of the wind turbine generator system.

SUMMARY

Based on the above, it is necessary to provide a lightning strike fault monitoring system for a wind turbine generator system and a lightning protection system to address the problem of poor safety in the wind turbine generator system.

A lightning protection system is provided, including a main body provided with a blind hole, a core, a connecting member made of a gasifiable material, a first elastic member, a second elastic member, a sealing cover, a bottom plate, and a switch configured to be connected between an external signal source and a detection terminal.

The core and the first elastic member are respectively accommodated in the blind hole, and the core is connected to the main body through the connecting member. An end of the first elastic member abuts against the core, and another end of the first elastic member is connected to a bottom wall of the blind hole. A side of the sealing cover is connected to the bottom plate through the second elastic member, and another side of the sealing cover abuts against the core. The switch is mounted on the bottom plate.

In an embodiment, the first elastic member is a spring, and the second elastic member is a torsion spring.

In an embodiment, the connecting member is a buckle.

In an embodiment, a sidewall of the blind hole of the main body is provided with a protrusion, and the core is mounted on the protrusion of the main body through the connecting member.

A lightning strike fault monitoring system for a wind turbine generator system is also provided, including a detecting terminal, a server terminal, and any one of the lightning protection system described above. The lightning protection system is connected to the server terminal through the detecting terminal, and the lightning protection system is mounted on a wind turbine generator system to be detected.

The lightning protection system is configured to output an electrical signal to the detecting terminal when detecting that the wind turbine generator system to be detected is struck by lightning. The detecting terminal is configured to transmit the electrical signal to the server terminal. The server terminal is configured to perform a fault analysis according to the electrical signal, to obtain a fault detection result.

In an embodiment, the number of the detecting terminal is at least two, the number of the lightning protection systems is at least two, and each detecting terminal is correspondingly connected to at least one lightning protection system respectively.

In an embodiment, when the server terminal performs the fault analysis according to the electrical signal, to obtain the fault detection result, the server terminal is further configured to record the number of times the electrical signal is received by the server terminal, and determine a fault occurrence as the fault detection result and send an alert signal when the recorded number exceeds a preset number.

In an embodiment, the lightning strike fault monitoring system further includes a mobile terminal, the mobile terminal connected to the server terminal, and configured to receive information transmitted from the server terminal, the information including the alert signal.

In an embodiment, the information further includes operational status information of the lightning strike fault monitoring system.

In an embodiment, the lightning strike fault monitoring system further includes an alert terminal, through which the detecting terminal is connected to the server terminal.

In the above lightning protection system, initially, the switch is switched off. When the lightning protection system is struck by lightning, a large amount of current may flow into the lightning protection system, to heat the core in the lightning protection system. Since the connecting member is made of a gasifiable material, the connecting member may be gasified at a high temperature. As the connecting member is connected to the core, the heat generated by the heated core may be transferred to the connecting member, and the temperature of the connecting member may increase, so that the connecting member is gasified to make the core disconnect and separate from the main body. In this way, the core is ejected from the blind hole of the main body under the action of the elastic force of the first elastic member. At this moment, the other side of the sealing cover no longer abuts against the core, and then the force applied by the core to the sealing cover is lost. The sealing cover moves to change its position by the action of the second elastic member. The second elastic member is connected to the bottom plate, and the switch is mounted on the bottom plate. During the movement of the second elastic member, the switch is driven to be switched on, so that the external signal source is communicated with the detecting terminal through the switch which has been switched on, to provide an electrical signal to the detecting terminal to inform the detecting terminal that the lightning protection system has been struck by the lightning and the core has been ejected. In this way, the lightning protection system can accurately provide the electrical signal to the detection terminal, so that the maintainer can be accurately aware of the occurrence of a lightning strike in order to perform maintenance and troubleshooting for a lightning strike fault, thereby improving safety.

In the lightning strike fault monitoring system for a wind turbine generator system, the lightning protection system is mounted on the wind turbine generator system to be detected, and is used for detecting the status of the wind turbine generator system subjected to a lightning strike, that is, detecting whether the wind turbine generator system is subjected to a lightning strike. When detecting that the wind turbine generator system is subjected to a lightning strike, the lightning protection system outputs an electrical signal to the detecting terminal. After receiving the electrical signal, the detecting terminal forwards the electrical signal to the server terminal. Since the electrical signal is sent out only when the lightning protection system is subjected to a lightning strike, after receiving the electrical signal, the server terminal can perform a fault analysis to obtain a fault detection result. The maintainer can perform an effective fault inspection according to the fault detection result subsequently, so as to avoid the problem of unsafety caused by unstable operation of the wind turbine generator system upon failure of the wind turbine generator system occurs if the occurrence of the lightning strike to the wind turbine generator system is not available.

In this way, the safety of wind turbine generator system has been improved.

DETAILED DESCRIPTION

Figure 1:
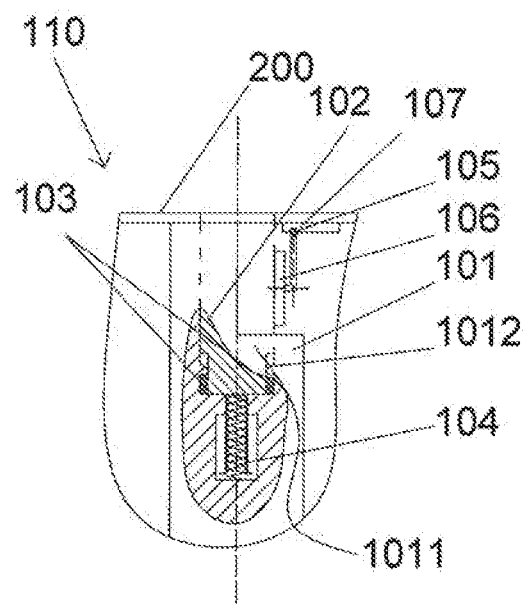
FIG. 1 is a structural schematic diagram illustrating a cross section of a lightning protection system according to an embodiment.
Figure 2:
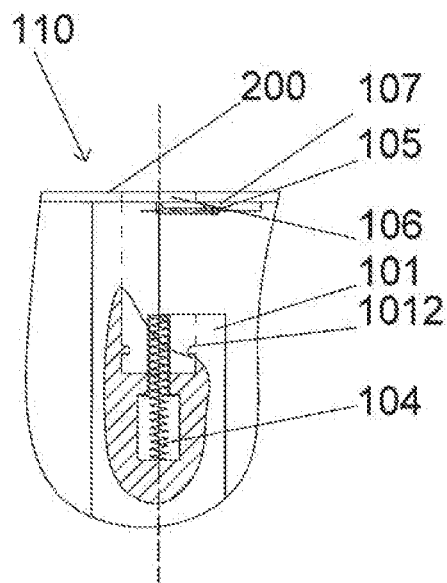
FIG. 2 is a structural schematic diagram illustrating a cross section of a lightning protection system according to another embodiment, in which a core is ejected.

Referring to FIG. 1 and FIG. 2, a lightning protection system 110 according to an embodiment is provided. The lightning protection system includes a main body 101 provided with a blind hole 1011, a core 102, a connecting member 103 made of a gasifiable material, a first elastic member 104, a second elastic member 105, a sealing cover 106, a bottom plate 107, and a switch (not shown) configured to be connected between an external signal source and a detecting terminal.

The core 102 and the first elastic member 104 are respectively accommodated in the blind hole 1011. The core 102 is connected to the main body 101 through the connecting member 103 made of the gasifiable material. One end of the first elastic member 104 abuts against the core 102, and the other end of the first elastic member 104 is connected to the bottom wall of the blind hole 1011. One side of the sealing cover 106 is connected to the bottom plate 107 through the second elastic member 105, and the other side of the sealing cover 106 abuts against the core 102. The switch is mounted on the bottom plate 107.

The other end of the first elastic member 104 is connected to the bottom wall of the blind hole 1011 in such a way that the other end of the first elastic member 104 is fastened to the bottom wall of the blind hole 1011. In this way, even if one end of the first elastic member 104 is driven by an elastic force to move, the entire first elastic member 104 is still fastened to the bottom wall of the blind hole 1011. When one end of the first elastic member 104 moves, a force is applied to the core 102 abutting against the first elastic member 104. The core 102 is mounted in the main body 101 through the connecting member 103 made of the gasifiable material, and one end of the first elastic member 104 abuts against the core 102. In addition, one side of the sealing cover 106 is connected to the bottom plate 107 through the second elastic member 105, that is, the sealing cover 106 is mounted on the bottom plate 107 through the second elastic member 105. And the other side of the sealing cover 106 abuts against the core 102 disposed in the blind hole 1011. That is, one side of the sealing cover 106 is connected to the bottom plate 107. The second elastic member 105 applies a force to one side of the sealing cover 106, and the core 102 applies a force to the other side of the sealing cover 106 by abutting against the other side of the sealing cover 106. The two sides of the sealing cover 106 are respectively subjected to forces from different members such that the sealing cover 106 can be placed between the core 102 and the second elastic member 105.

In the above lightning protection system 110, initially, the switch is switched off. When the lightning protection system is struck by lightning, a large amount of current may flow into the lightning protection system 110, to heat the core 102 in the lightning protection system 110. Since the connecting member 103 is made of the gasifiable material, the connecting member 103 may be gasified at a high temperature. As the connecting member 103 is connected to the core 102, the heat generated by the heated core 102 may be transferred to the connecting member 103, and the temperature of the connecting member 103 may increase, so that the connecting member 103 is gasified to make the core 102 disconnect and separate from the main body 101. In this way, the core 102 is ejected from the blind hole 1011 of the main body 101 under the action of the elastic force of the first elastic member 104. At this moment, the other side of the sealing cover 106 no longer abuts against the core 102, and then the force applied by the core 102 to the scaling cover is lost. The sealing cover 106 moves to change its position by the action of the second elastic member 105. The second elastic member 105 is connected to the bottom plate, and the switch is mounted on the bottom plate. During the movement of the second elastic member 105, the switch is driven to be switched on, so that the external signal source is communicated with the detecting terminal through the switch which has been switched on, to provide an electrical signal to the detecting terminal to inform the detecting terminal that the lightning protection system 110 has been struck by the lightning and the core 102 has been ejected. In this way, the lightning protection system 110 can accurately provide the electrical signal to the detection terminal, so that the maintainer can be accurately aware of the occurrence of a lightning strike in order to perform maintenance and troubleshooting of lightning strike failure, thereby improving safety. Meanwhile, the core 102 of the lightning protection system 110 is ejected to carry away heat, so as to avoid the damage to devices connected to, in contact with or close to the lightning protection system 110 due to high temperature expansion and contraction.

In an embodiment, the first elastic member 104 is a spring, and the second elastic member 105 is a torsion spring. As such, the spring and torsion spring are at low cost, which can control the manufacturing cost of the lightning protection system 110, and facilitate the manufacture of the lightning protection system 110.

In an embodiment, the connecting member 103 is a buckle. The buckle has a simple structure, which may simplify the structure of the lightning protection system 110, with low cost and convenient to use.

Figure 3:
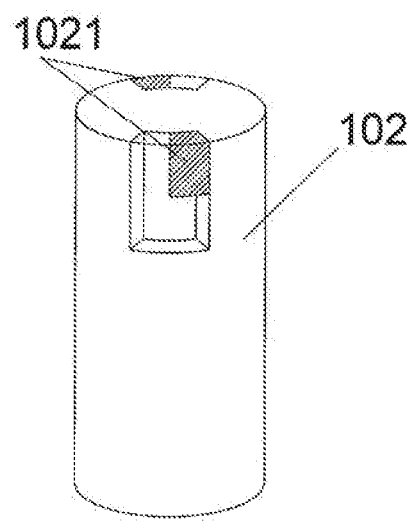
FIG. 3 is a structural schematic diagram illustrating a core and a buckle connected to the core in the lightning protection system in FIG. 1.

Referring to FIG. 3, in this embodiment, a mounting groove 1021 for accommodating a partial buckle is arranged on a sidewall of the core 102. Specifically, one end of the buckle is placed in the mounting groove 1021 and is engaged with the core 102. The other end of the buckle is engaged with the main body 101. In this way, the core 102 is engaged with the main body 101 by the buckle.

Further, the number of the mounting grooves 1021 is two, the number of the buckles is two, and each of the mounting grooves 1021 is accommodated with a part of one buckle, so that even if one of the buckles is broken, the core 102 and the main body 101 can be connected by another unbroken buckle, which may improve the quality of the lightning protection system 110.

In an embodiment, the sidewall of the blind hole 1011 of the main body 101 is provided with a protrusion 1012, and the core 102 is mounted on the protrusion 1012 of the main body 101 through the connecting member 103.

Since the core 102 abuts against one end of the first elastic member 104, the one end of the first elastic member 104 applies a force to the core 102, and the core 102 is movable under the action of the force. In order to fasten the core 102 to the main body 101, it needs to provide a force corresponding to the force applied by the first elastic member 104. By providing the connecting member 103 to apply a force to the core 102, it allows the core 102 to be mounted on the main body 101. By providing the protrusion 1012 on the sidewall of the blind hole 1011 of the main body 101, it facilitates to mount and fasten the core 102 to the main body 101.

In an embodiment, the lightning protection system 110 further includes a ground down lead connected to the main body 101.

When a lightning strike occurs, lightning current is introduced into the system through the lightning protection system 110. The lightning current passes through the blade 200 of the wind turbine generator, the hub cover, the nacelle cover and the tower, respectively by the ground down lead, and is then finally released into the ground. The ground down lead plays a role to protect the wind turbine generator.

Figure 4:
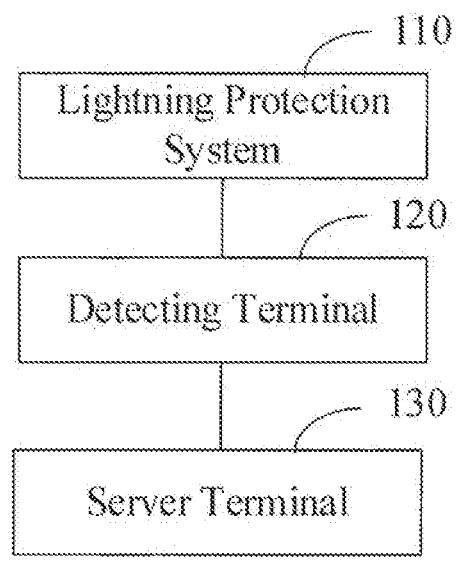
FIG. 4 is a block diagram of a lightning strike fault monitoring system for a wind turbine generator system according to an embodiment.

Referring to FIG. 4, a lightning strike fault monitoring system for a wind turbine generator system according to an embodiment is provided. The lightning strike fault monitoring system includes a detecting terminal 120, a server terminal 130, and a lightning protection system 110 as described above. The lightning protection system 110 is connected to the server terminal 130 through the detecting terminal 120. The lightning protection system 110 is mounted on a wind turbine generator system to be detected.

The lightning protection system 110 is configured to output an electrical signal to the detecting terminal 120 when detecting that the wind turbine generator system to be detected is struck by lightning. The detecting terminal 120 is configured to transmit the electrical signal to the server terminal 130. The server terminal 130 is configured to perform a fault analysis according to the received electrical signal, to obtain a fault detection result.

In the lightning strike fault monitoring system for a wind turbine generator system, the lightning protection system 110 is mounted on the a wind turbine generator system to be detected, and is used for detecting the status of the wind turbine generator system subjected to a lightning strike, that is, detecting whether the wind turbine generator system is suffered to a lightning strike. When detecting that the wind turbine generator system is subjected to a lightning strike, the lightning protection system 110 outputs an electrical signal to the detecting terminal 120. After receiving the electrical signal, the detecting terminal 120 forwards the electrical signal to the server terminal 130. Since the electrical signal is sent out only when the lightning protection system 110 is subjected to a lightning strike, after receiving the electrical signal, the server terminal 130 can perform a fault analysis to obtain the fault detection result. The maintainer can perform an effective fault inspection according to the fault detection result subsequently, so as to avoid the problem of unsafety caused by unstable operation of the wind turbine generator system generator system upon failure of the wind turbine generator system occurs if the occurrence of the lightning strike to the wind turbine generator system is not available. In this way, the safety of wind turbine generator system has been improved. At the same time, when the wind turbine generator system is struck by lightning, the lightning strike energy is too large, and the huge lightning current hits the lightning protection system 110, so that the core of the lightning protection system 110 is heated sharply. At this time, the connecting member of the lightning protection system 110 is gasified. The core of the lightning protection system 110 is ejected to carry away the heat, so as to avoid the damage to other devices due to high temperature expansion and contraction.

Specifically, the detecting terminal 120 mentioned above may be any type of terminal capable of transmitting information, for example, including but not limited to, a communication device, an intelligent terminal, or other terminals capable of transmitting information. For example, when the detecting terminal 120 is a communication device, after receiving the electrical signal sent by the lightning protection system 110, the detecting terminal 120 forwards the electrical signal to the server terminal 130, so that the information transmission between the lightning protection system 110 and the server terminal 130 is achieved. When the detecting terminal 120 is an intelligent terminal, after receiving the electrical signal sent by the lightning protection system 110, the detecting terminal 120 forwards the electrical signal to the server terminal 130. In one example, the detecting terminal 120 may be mounted on the blade 200 of the wind turbine generator system, and further, the detecting terminal 120 may be mounted on the blade 200 of the wind turbine generator system to be detected.

In an embodiment, the lightning protection system 110 is mounted inside a blade 200 of the wind turbine generator system to be detected, and the blade 200 is provided with an opening. The opening is in communication with the blind hole.

After the connecting member is gasified when the lightning protection system 110 is subjected to a lightning strike, the force to hold the core on the main body is lost, and the core is ejected from the blind hole under the action of the force of the first elastic member. The blind hole is in communication with the opening, so that the core can be ejected out of the interior of the lightning protection system 110 and the interior of the blade 200 from the blind hole and the opening. The core is ejected when the lightning protection system 110 is subjected to a lightning strike, so that the sealing cover moves to the opening under a thrust of the torsion spring and then blocks the communication between the blind hole and the opening. Thereby the sealing cover blocks the communication between the blind hole and the outside of the blade of the wind turbine generator system. Further, the sealing cover can seal the opening, that is, the sealing cover of the lightning protection system 110 rotates under the action of the torsion spring to close the opening of the blade 200.

The lightning protection system 110 is located inside the blade 200 of the wind turbine generator system. When the wind turbine generator system is subjected to a lightning strike, the lightning strike energy is too large, and the huge lightning current hits the lightning protection system 110, so that the core of the lightning protection system 110 is heated sharply. At this moment, the buckle of the lightning protection system 110 is gasified, and the core of the lightning protection system 110 at a high-temperature is ejected out of the blade 200 to carry away the heat, so as to avoid the damage to the blade due to high temperature expansion and contraction. The sealing cover of the lightning protection system 110 rotates to close the opening of the blade 200 under the action of the torsion spring, while the core of the lightning protection system 110 is ejected.

In an embodiment, the number of detecting terminals 120 is at least two, and the number of lightning protection systems 110 is at least two. Each detecting terminal 120 is respectively connected to at least one lightning protection system 110.

For a single lightning protection system 110, if it fails to perform the lightning strike detection normally, when the wind turbine generator system is struck by lightning, the lightning strike may not be detected the lightning protection system 110, i.e., a missing detection occurs, resulting in a subsequent fault detection error, which impacts the safety of the wind turbine generator system greatly. In addition, the detection result of the single lightning protection system 110 may be contingent. Based on the above considerations, a plurality of detecting terminals 120 and a plurality of lightning protection systems 110 may be provided. In this case, even if one of the lightning protection systems 110 is damaged, the lightning strike detection can be performed by other undamaged lightning protection systems 110 to avoid the missing detection. And the lightning strike detection with multiple lightning protection systems 110 can avoid the contingency of the detection, accurately detect lightning strikes, improve the accuracy of subsequent fault detection, facilitate subsequent accurate fault investigation, and improve the safety of the wind turbine generator system.

Further, at least one detecting terminal 120 is mounted on each blade 200 of the wind turbine generator system to be detected. Since each detecting terminal 120 is respectively connected to at least one lightning protection system 110, at least one lightning protection system 110 is provided on each blade 200. Thus, by detecting whether each blade 200 of the wind turbine generator system is subjected to a lightning strike by the lightning protection system 110, the safety of wind turbine generator system is improved.

In an embodiment, when the server terminal 130 performs the fault analysis according to the electrical signal, to obtain the fault detection result, the server terminal 130 may record the number of times the electrical signal is received by the server terminal 130. When the recorded number exceeds a preset number, the server terminal 130 may determine a fault occurrence as the fault detection result, and send an alert signal.

In this embodiment, the server terminal 130 determines whether there is a potential fault by analyzing the number of times the electrical signal is received. Since the electrical signal is sent only after the core is ejected when the wind turbine generator system is subjected to a lightning strike detected by the lightning protection system 110, that is, the wind turbine generator system has suffered a strong lightning strike so that the core is ejected, and the wind turbine generator system is easy to malfunction under the strong lightning strike. Therefore, according to the number of times the electrical signal is received, the number of times the core ejected out of the lightning protection system 110 can be known, thereby it is known how many lightning protection systems 110 have detected the lightning strike. If the recorded number exceeds the preset number, it indicates that the number of the lightning protection systems 110 in which the core is ejected exceeds the preset number, and it is very likely that a fault has occurred. That is, the fault detection result is determined as a fault occurrence. And then an alert signal is sent to notice the maintainer, so that the maintainer can repair it in time to ensure the safety of the wind turbine generator system.

In an embodiment, the lightning strike fault monitoring system for the wind turbine generator system mentioned above further includes a mobile terminal connected to the server terminal 130, and configured to receive information transmitted from the server terminal 130. The information includes an alert signal.

In order to facilitate the user (maintainer or others) to timely understand the situation of the wind turbine generator system, the lightning strike fault monitoring system for the wind turbine generator system is further provided with a mobile terminal (for example, a mobile phone or a palmtop computer, etc.). The server terminal 130 performs a fault analysis according to the electrical signal. That is, analyzing whether the recorded number exceeds the preset number. When the recorded number exceeds the preset number, an alert signal is sent, and the alert signal is sent to the mobile terminal. After receiving the alert signal by the mobile terminal, the maintainer who holds the mobile terminal can know in time, for example, that the wind turbine generator system malfunction, so that the maintainer can timely perform a repair of the wind turbine generator system. It is convenient for the maintainer to maintain and improve the maintenance efficiency.

In an embodiment, the information further includes operational status information of the lightning strike fault monitoring system for the wind turbine generator system.

The status information includes core ejecting information, and the core ejecting information includes core ejected information or core non-ejected information. After the server terminal 130 receives the electrical signal of the lightning protection system 110, it indicates that the core corresponding to the lightning protection system 110 is ejected. Then the server terminal 130 can determine the core of the lightning protection system 110 has been ejected according to the electrical signal, that is, the core ejected information can be obtained. If the electrical signal of the lightning protection system 110 is not received, the server terminal 130 can determine that the core of the lightning protection system 110 is not ejected, that is, the core non-ejected information can be obtained.

Further, the operational status information may further include the operational status information of the terminal 120. The server terminal 130 is connected to the detecting terminal 120 to perform data communication. However, when the detecting terminal 120 is at fault and unable to communicate with the server terminal 130 normally, the terminal 130 may record the communication status of each detecting terminal 120 to obtain the operational status of each detecting terminal 120. If the communication is normal, the detecting terminal 120 is considered to be in a normal operational state. If the communication is not normal, the detecting terminal 120 is considered to be in a faulty operational state and an abnormal state. The server terminal 130 may send the operational status information of each detecting terminal 120 to the mobile terminal, so that the maintainer can timely understand the operational status of each detecting terminal 120 in the lightning strike fault monitoring system for the wind turbine generator system for subsequent maintenance.

Figure 5:
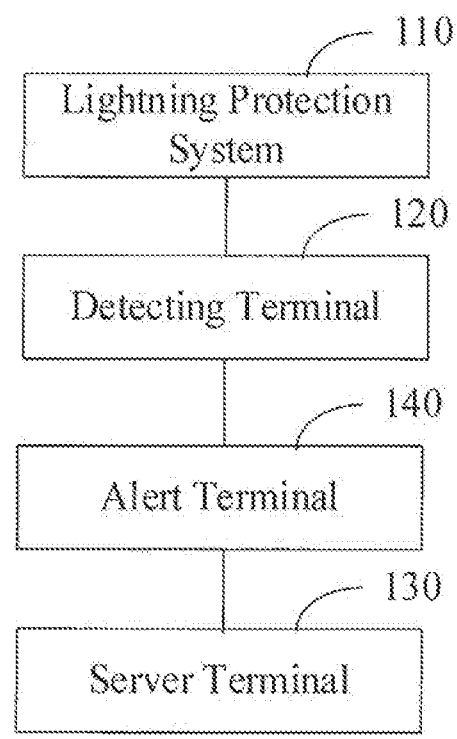
FIG. 5 is a block diagram of a lightning strike fault monitoring system for a wind turbine generator system according to another embodiment.

Referring to FIG. 5, in an embodiment, the lightning strike fault monitoring system for the wind turbine generator system mentioned above further includes an alert terminal 140, and the detecting terminal 120 is connected to the server terminal 130 through the alert terminal 140.

In order to further provide an alert service for the maintainer, and to allow the maintainer accurately and timely know that a fault occurs, in this embodiment, an alert terminal 140 is further provided. The alert terminal 140 may be any terminal capable of transmitting information and sending out an alert. For example, it may include, but is not limited to, a smart terminal, or other terminals capable of transmitting information and sending out an alert.

In an embodiment, the alert terminal 140 includes a first microprocessor, a first wireless self-organizing network communication module and a network communication module. The first wireless self-organizing network communication module and the network communication module are connected to the first microprocessor respectively. The alert terminal 140 is connected to the detecting terminal 120 through the first wireless self-organizing network communication module, and the alert terminal 140 is connected to the server terminal 130 through the network communication module.

The first microprocessor may receive the electrical signal sent by the detecting terminal 120 through the first wireless self-organizing communication module, and may send alert information according to the electrical signal sent by the detecting terminal 120 to notice the maintainer that the wind turbine generator system may be struck by lightning. It is convenient for the maintainer to repair quickly. In addition, the first microprocessor may transmit an electrical signal to the server terminal 130 through the network communication module, to allow the server terminal 130 to know whether the wind turbine generator system is struck by lightning.

In an embodiment, the detecting terminal 120 includes a second microprocessor and a second wireless self-organizing network communication module connected to the second microprocessor. The detecting terminal 120 is connected to the lightning protection system 110 through a power line, and the second wireless self-organizing network communication module is connected to the server terminal 130.

The detecting terminal 120 receives the electrical signal sent by the lightning protection system 110 through the second wireless self-organizing network communication module, and sends the electrical signal to the server terminal 130. It can be understood that the detecting terminal 120 may be connected to the alert terminal 140 through the second wireless self-organizing network module. That is, the detecting terminal 120 may transmit an electrical signal to the server terminal 130 through the second wireless self-organizing network module and the alert terminal 140.

Each of the technical features of the above embodiments may be arbitrarily combined. To simplify the description, not all possible combinations of the technical features in the above embodiments are described. However, all of the combinations of these technical features should be considered as within the scope of the present specification, as long as there is no contradiction in such combinations.

The above embodiments merely represent several embodiments of the present disclosure, and the description thereof is more specific and detailed, but it should not be construed as limiting the scope of the present disclosure. It should be noted that, for those skilled in the art, several variations and improvements may be made without departing from the concept of the present disclosure, and these are all within the protection scope of the present disclosure. Therefore, the scope of protection of the present disclosure shall be subject to the appended claims.

What is claimed is:

1. A lightning protection system, comprising: a main body provided with a blind hole; a core; a connecting member made of a gasifiable material; a first elastic member; a second elastic member; a sealing cover; a bottom plate; and a switch configured to be connected between an external signal source and a detection terminal, wherein:

said core and said first elastic member are respectively accommodated in said blind hole; said core is connected to said main body through said connecting member; an end of said first elastic member abuts against said core, and another end of said first elastic member is connected to a bottom wall of said blind hole; a side of said sealing cover is connected to said bottom plate through said second elastic member, and another side of said sealing cover abuts against said core; and said switch is mounted on said bottom plate.

2. The lightning protection system according to claim 1, wherein said first elastic member is a spring, and said second elastic member is a torsion spring.

3. The lightning protection system according to claim 1, wherein said connecting member is a buckle.

4. The lightning protection system according to claim 1, wherein a sidewall of said blind hole of said main body is provided with a protrusion, and said core is mounted on said protrusion of said main body through said connecting member.

5. A lightning strike fault monitoring system for a wind turbine generator system, comprising: a detecting terminal; a server terminal; and said lightning protection system according to claim 1, wherein:

said lightning protection system is connected to said server terminal through said detecting terminal, and said lightning protection system is mounted on a wind turbine generator system to be detected;

said lightning protection system is configured to output an electrical signal to said detecting terminal when detecting that said wind turbine generator system to be detected is struck by lightning;

said detecting terminal is configured to transmit said electrical signal to said server terminal; and said server terminal is configured to perform a fault analysis according to said electrical signal, to obtain a fault detection result.

6. The lightning strike fault monitoring system according to claim 5, wherein the number of said detecting terminal is at least two, the number of said lightning protection system is at least two, and each detecting terminal is correspondingly connected to at least one lightning protection system respectively.

7. The lightning strike fault monitoring system according to claim 5, wherein when said server terminal performs said fault analysis according to said electrical signal, to obtain said fault detection result, said server terminal is further configured to record the number of times said electrical signal is received by said server terminal, and determine a fault occurrence as said fault detection result and send an alert signal when the recorded number exceeds a preset number.

8. The lightning strike fault monitoring system according to claim 7, further comprising: a mobile terminal connected to said server terminal, and configured to receive information transmitted from said server terminal, said information comprising said alert signal.

9. The lightning strike fault monitoring system according to claim 8, wherein said information further comprises operational status information of said lightning strike fault monitoring system.

10. The lightning strike fault monitoring system according to claim 5, further comprising: an alert terminal, through which said detecting terminal is connected to said server terminal.

* * * * *